United States Patent
Estevez et al.

(10) Patent No.: US 12,114,246 B2
(45) Date of Patent: Oct. 8, 2024

(54) SIMPLE MESH NETWORK FOR WIRELESS TRANSCEIVERS

(71) Applicant: TEXAS INSTRUMENTS INCORPORATED, Dallas, TX (US)

(72) Inventors: Leonardo Estevez, Rowlett, TX (US); Avraham Baum, Giva't Shmuel (IL); Benzy Gabay, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 394 days.

(21) Appl. No.: 17/568,430

(22) Filed: Jan. 4, 2022

(65) Prior Publication Data

US 2022/0132389 A1    Apr. 28, 2022

Related U.S. Application Data

(63) Continuation of application No. 14/031,918, filed on Sep. 19, 2013, now Pat. No. 11,218,942.

(51) Int. Cl.
*H04W 40/00* (2009.01)
*H04W 84/18* (2009.01)

(52) U.S. Cl.
CPC ............ *H04W 40/00* (2013.01); *H04W 84/18* (2013.01)

(58) Field of Classification Search
None
See application file for complete search history.

(56) References Cited

U.S. PATENT DOCUMENTS

| | | |
|---|---|---|
| 2003/0031127 A1 | 2/2003 | Saleh et al. |
| 2006/0215582 A1* | 9/2006 | Castagnoli ............ H04L 45/20 370/254 |
| 2008/0192713 A1 | 8/2008 | Mighani et al. |
| 2008/0310342 A1 | 12/2008 | Kruys et al. |
| 2009/0161558 A1* | 6/2009 | Hirano .................... H04L 45/18 370/242 |
| 2010/0014442 A1* | 1/2010 | Ashwood-Smith ..... H04L 45/00 370/255 |
| 2011/0158127 A1 | 6/2011 | Duo et al. |
| 2011/0164527 A1 | 7/2011 | Mishra et al. |
| 2011/0255449 A1 | 10/2011 | Rappaport |
| 2011/0268013 A1* | 11/2011 | Levendel ............ H04W 40/248 370/315 |
| 2012/0100870 A1 | 4/2012 | Prost et al. |
| 2012/0106528 A1 | 5/2012 | Estevez et al. |
| 2012/0127903 A1 | 5/2012 | Estevez et al. |

(Continued)

OTHER PUBLICATIONS

IEEE Computer Society, "Wireless LAN Medium Access Control (MAC) and Physical Layer Specification"; IEEE 802.11; Mar. 29, 2012.

*Primary Examiner* — Brian S Roberts
(74) *Attorney, Agent, or Firm* — Mandy Barsilai Fernandez; Frank D. Cimino

(57) ABSTRACT

A method of operating a mesh network is disclosed (FIG. 6). The method includes receiving a data frame (600) having a header with plural addresses (FIG. 1) and determining that the data frame is not from an access point or a leaf node (602) of the mesh network. A next recipient address of the plural addresses is removed (610) when the next recipient is a final destination. The next recipient address is set (612) when the next recipient of the data frame is not a final destination. The data frame is transmitted (614) to the next recipient.

20 Claims, 5 Drawing Sheets

FIGURE 6

(56) References Cited

U.S. PATENT DOCUMENTS

| | | | |
|---|---|---|---|
| 2013/0070671 A1* | 3/2013 | Ezure | H04W 40/02 |
| | | | 370/328 |
| 2013/0163412 A1 | 6/2013 | Hughes et al. | |
| 2013/0250823 A1 | 9/2013 | Gaylard et al. | |
| 2014/0071883 A1 | 3/2014 | Abraham et al. | |

* cited by examiner

| FRAME CONTROL | DURATION /ID | ADDRESS 1 | ADDRESS 2 | ADDRESS 3 | SEQUENCE CONTROL | ADDRESS 4 | QoS CONTROL | HT CONTROL | FRAME BODY | FCS |
|---|---|---|---|---|---|---|---|---|---|---|
| | | | | MAC HEADER | | | | | | |

FIG. 1
(PRIOR ART)

SIMPLE MESH NETWORK FOR WIRELESS TRANSCEIVERS

CROSS-REFERENCE TO RELATED APPLICATIONS

The present application is a continuation of U.S. patent application Ser. No. 14/031,918, filed Sep. 19, 2013, which is incorporated by reference herein in its entirety.

BACKGROUND OF THE INVENTION

The present embodiments relate to wireless mesh communication systems and, more particularly, to a communication protocol that is backwards compatible with existing IEEE 802.11 standards.

A wireless mesh network is a type of wireless communication where at least one wireless transceiver must not only receive and process its own data, but it must also serve as a relay for other wireless transceivers in the network. This may be accomplished by a wireless routing protocol where a data frame is propagated within the network by hopping from transceiver to transceiver to transmit the data frame from a source node to a destination node. A wireless node may be a wireless access point such as a wireless router, a mobile phone, or a computer capable of accessing the wireless local area network (WLAN). In other applications, the wireless node may be an external security monitor, a room monitor, a fire or smoke detector, a weather station, or any number of other WLAN applications for home or business environments.

A practical mesh network must maintain continuous network paths for all wireless nodes. This requires reliable network formation, reconfiguration around broken or interrupted network paths, and prioritized routing to ensure that data frames travel from source to destination along short yet reliable network paths.

FIG. 1 shows an exemplary medium access control (MAC) header of the prior art that may be appended to IEEE 802.11 data frames for wireless network communication. The first three fields (Frame Control, Duration/ID, and Address 1) and the last field (FCS) are present in all frames. The remaining fields are present only in certain frame types and subtypes of frames. The four address fields are used to indicate a basic service set identifier (BSSID), source address (SA), destination address (DA), transmitting station (STA) address (TA), and receiving STA address (RA).

FIG. 2 is a diagram showing a problem of limited range within an exemplary wireless mesh network. Access point (AP) 200 is directly connected to the internet and serves network nodes within area 202. These network nodes include non-legacy leaf node (NLN) 206, legacy leaf node (LLN) 208, and relay node (RN) 210. RN 210 has a range 204 that is smaller than area 202. However, area 204 extends beyond the coverage of area 202 of AP 200. Thus, RN 210 may relay data packets between LLN 212 and AP 200. Present proposals for IEEE 802.11-2012 provide for such a RN. Implementation, however, is difficult and is not compatible with legacy network nodes.

Although network proposals of the prior art provide steady improvements in wireless network communications, the present inventors recognize that still further improvements in mesh network protocol are possible. Accordingly, preferred embodiments described below are directed toward this and other improvements over the prior art.

BRIEF SUMMARY OF THE INVENTION

In a preferred embodiment of the present invention, there is disclosed a method of operating a mesh network in a wireless communication system. The method includes receiving a data frame having a header with plural addresses and determining that the data frame source is not an access point or a leaf node of the mesh network. A next address of the plural addresses is removed when a next recipient of the data frame is a final destination. The next address of the next recipient is set when the next recipient of the data frame is a final destination. The data frame is then transmitted to the next recipient.

BRIEF DESCRIPTION OF THE SEVERAL VIEWS OF THE DRAWING

FIG. 1 is a diagram of an IEEE 802.11 medium access control (MAC) header of the prior art;

DETAILED DESCRIPTION OF THE INVENTION

Figure 2:
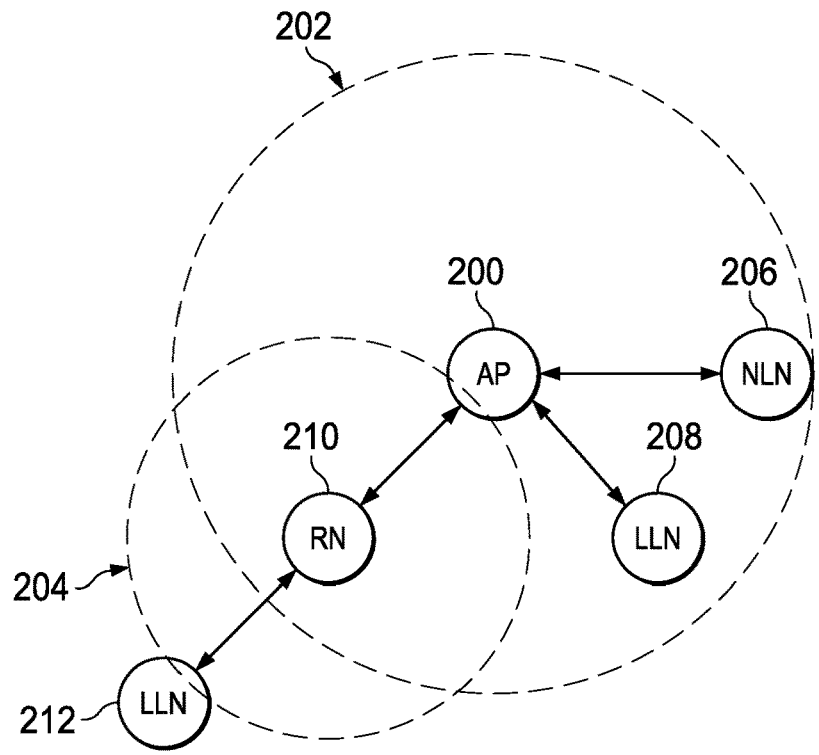
FIG. 2 is a diagram showing a problem of limited range within an exemplary wireless mesh network.
Figure 3:
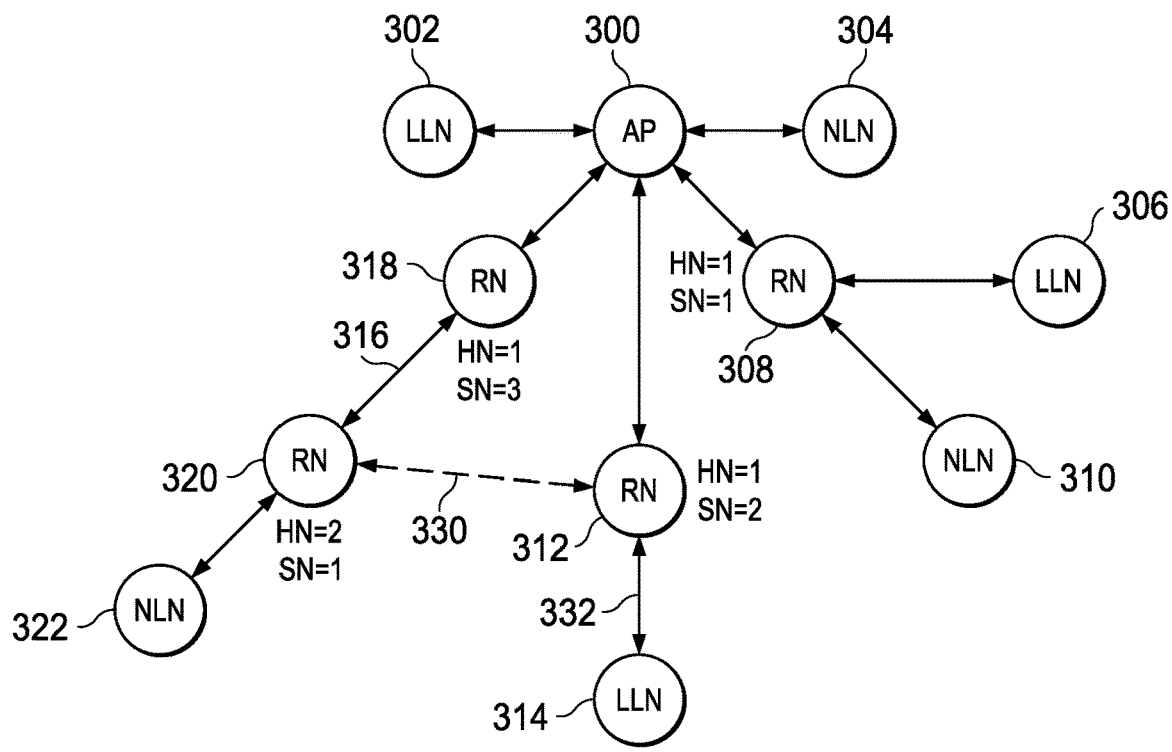
FIG. 3 is a diagram of a simple mesh wireless network of the present invention.

Referring now to FIG. 3, there is a diagram of a simple mesh wireless network of the present invention. The mesh network includes access point (AP) 300 which may be a wireless router having access to the internet by digital subscriber line (DSL), satellite, or other data source. AP 300 communicates directly with legacy leaf node (LLN) 302. Here, arrows are used to indicate wireless connection. AP 300 also communicates directly with non-legacy leaf node (NLN) 304. Finally, AP 300 directly communicates with relay nodes (RN) 308, 312, and 318. Relay nodes such as 308, 312, 318, and 320 may be mobile devices such as cell phones, tablets, laptop or desktop computers, other wireless routers, or other suitable wireless devices according to the present invention. Leaf nodes 306, 310, 314, and 322 either do not have sufficient signal strength to communicate directly with AP 300 or receive a substantially better signal from a corresponding RN as indicated by a received signal strength indicator (RSSI). For example, LLN 306 and NLN 310 communicate directly with RN 308. RN 308 relays data frames between AP 300 and leaf nodes 306 and 310. Likewise, LLN 314 communicates directly 322 with RN 312, and RN 312 relays data frames between AP 300 and LLN 314. As previously mentioned, RN 318 communicates directly with AP 300. However, RN 318 does not communicate directly with NLN 322. Rather, RN 318 directly communicates 316 with RN 320. RN 320 directly communicates with NLN 322. Thus, RN 318 relays data frames between RN 320 and AP 300 whether the data frames originate with RN 320 or NLN 322. Correspondingly, RN 320 relays data frames between RN 318 and NLN 322. The mesh network further includes redundant data paths such as data path 330 between RN 312 and RN 320. Therefore, if RN 318 drops out of the mesh network or signal quality is sufficiently degraded, data frames are relayed between RN 320 and AP 300 by RN 312.

Figure 4:
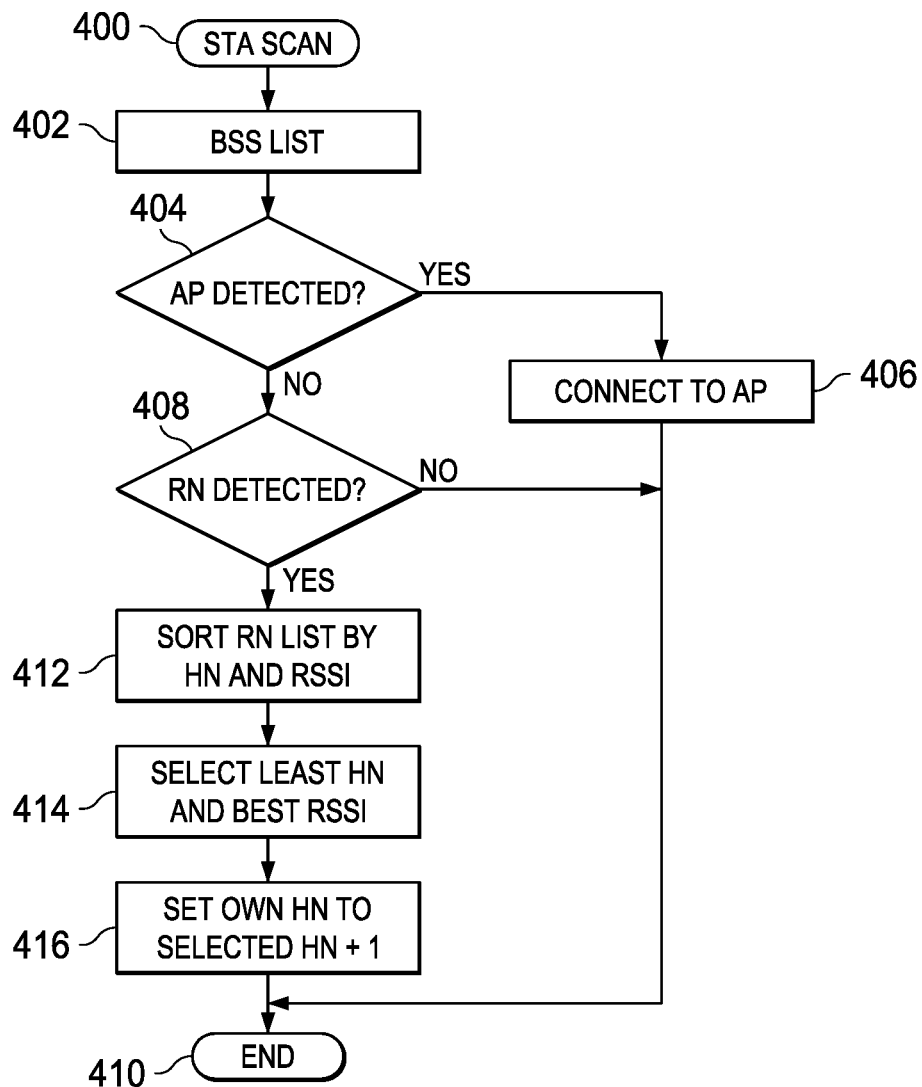
FIG. 4 is a flow diagram showing formation of the simple mesh network of FIG. 3.

Turning now to FIG. 4, there is a flow diagram showing formation of the simple mesh network of FIG. 3. The simple mesh network is preferably formed from the AP down to each leaf node (LN). The process begins when a wireless node wishing to join the mesh initiates a station scan 400. The wireless node then receives a basic service set (BSS) list 402 indicating all wireless nodes that are currently in the mesh network. If an AP is detected 404, the wireless node connects to the AP 406 and the process ends 410. This is the case when leaf nodes such as LLN 302 and NLN 304 join the mesh.

The process is slightly different when relay nodes such as RN 308, 312, and 318 join the mesh. Here, AP 300 is also detected at decision block 404. AP 300 has an implied hop number (HN) of 0. Each RN that directly connects to AP 300 adopts a HN of 1. The HN, therefore, indicates a logical distance from the AP. Moreover, RN 308 is the first RN to join the mesh and adopts a sibling number (SN) of 1. RN 312 is the second RN to join the mesh and adopts a SN of 2. RN 318 is the third RN to join the mesh and adopts a SN of 3.

At decision block 408, a wireless node wishing to join the mesh network determines if a RN is detected when no AP is detected. If no RN is detected, the wireless node is unable to join the mesh network and the process ends 410. Alternatively, if one or more RNs is detected, the wireless node sorts the RN list by HN and received signal strength indicator (RSSI) 412. For example, RN 320 detects RN 312 and RN 318. Both RN 312 and RN 318 have HN=1, but RN 318 has a greater RSSI. RN 320, therefore, selects 414 a primary connection 316 to RN 318 and a secondary or redundant connection 330 to RN 312. Moreover, according to the present invention each RN of the mesh may adopt several subordinate wireless nodes having a lower HN. RN 320 also sets 416 a HN=2, indicating it is one step further removed from AP 300 than either RN 312 or RN 318.

Legacy leaf nodes such as LLN 314 and 306 may simply connect to their respective RNs 312 and 308 as though they were directly connected to the AP. In this case, the respective RN simply relays upstream and downstream data frames between the LLN and the AP as will be explained in detail. In effect, the LLN thinks it is directly connected to the AP. Non-legacy leaf nodes (NLN) such as 310 and 322 connect to respective RNs 308 and 320 in a similar manner. However, NLN 310 also adopts HN=2 and SN=2 and may serve as a RN if another downstream LN should join the mesh. Likewise, NLN 322 adopts HN=3 and SN=1 and may serve as a RN if another downstream LN should join the mesh.

Figure 5:
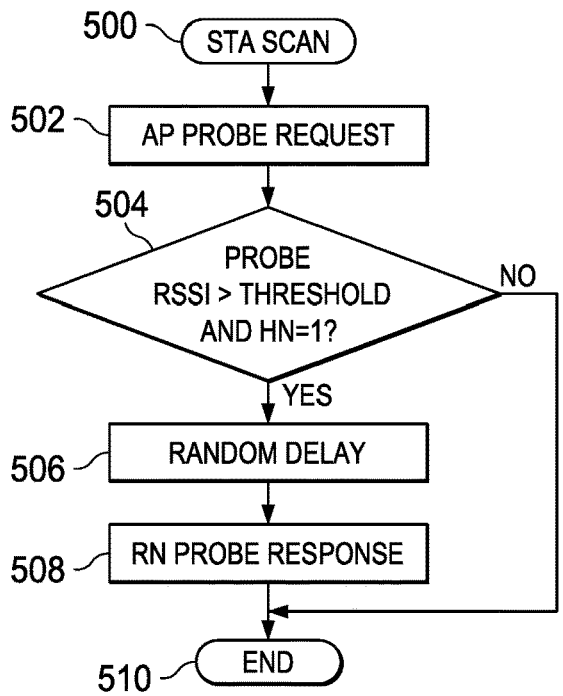
FIG. 5 is a flow diagram showing mesh discovery when a new wireless node enters the wireless network of FIG. 3.

Referring next to FIG. 5, there is a flow diagram showing mesh discovery when a new wireless node enters the wireless network of FIG. 3. A wireless node wishing to enter an existing mesh will initiate a station scan 500. As previously discussed with regard to FIG. 4, if an AP is detected 404 the wireless node will simply connect to the AP 406 and the process ends 410. Alternatively, the wireless node sends an AP probe request 502. Each RN in the mesh that receives the probe request will measure the RSSI of the probe. An RN that measures an RSSI above an acceptable threshold and has a HN=1 will wait a respective random delay period 506 and send a probe response 508 that is identical to an AP probe response. The random delay assures that the subsequent RN probe response 508 will not collide with a delayed AP response. If the wireless node is a NLN, it may select the RN with the lowest HN. Alternatively, if the wireless node is a LLN, it sends back an information element. The best RN then registers the NLN or LLN and announces the registration throughout the mesh to avoid multiple registration.

Figure 6:
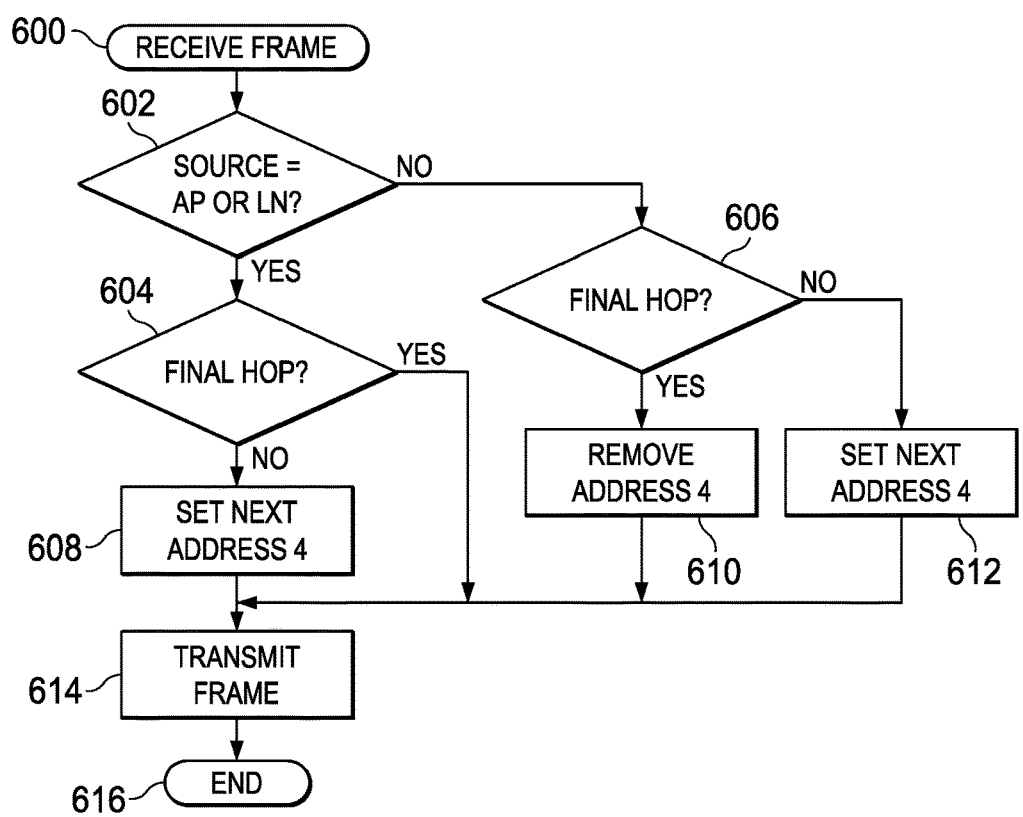
FIG. 6 is a flow diagram showing data frame distribution through a relay node (RN) within the wireless network of FIG. 3.

Referring now to FIG. 6, there is a flow diagram showing data frame distribution through a relay node (RN) within the wireless network of FIG. 3. For the simple case where a LLN 302 or NLN 304 is directly connected to AP 300, data frame distribution proceeds according to IEEE 802.11. An RN, however, first determines from the MAC header (FIG. 1) whether the data frame is directly from the AP or a LN 602. If decision block 602 is true, the RN then determines if this relay will be the final hop 604. For example, if RN 308 receives a data frame from AP 300 the relay to NLN 310 will be the final hop. Correspondingly, if RN 308 receives a data frame from NLN 310 the relay to AP 300 will also be the final hop. If the relay transmission is the final hop, RN 308 transmits the data frame to the destination address (DA) with no change to the MAC header. If decision block 604 determines that the relay transmission is not the final hop, the RN sets next address 4 of the MAC header to point to the next RN 608. For example, if RN 318 receives a data frame from AP 300 the relay to RN 320 will not be the final hop. RN 318, therefore, sets address 4 of the MAC header to point to RN 320 and transmits the data frame 614. Correspondingly, if RN 320 receives a data frame from NLN 322 the relay to RN 318 will not be the final hop. Thus, RN 320 sets address 4 of the MAC header to point to RN 318 and transmits the data frame 614. In either case, only the RN specified by address 4 of the MAC header will service the received data frame.

If decision block 602 determines that a received data frame is not from an AP or LN, then it must be from another RN. Decision block 606 then determines if the relay transmission will be the final hop. For example, if RN 318 receives a data frame from RN 320, the relay transmission from RN 318 to AP 300 will be the final hop. In this case, address 4 of the MAC header is removed 610 and the data frame is relayed to AP 300 in a standard three address format according to IEEE 802.11. Likewise, if RN 320 receives a data frame from RN 318, the relay transmission from RN 320 to NLN 322 will be the final hop. In this case, address 4 of the MAC header is also removed 610 and the data frame is relayed to NLN 322 in the standard three address format according to IEEE 802.11. However, when decision block 606 determines that the relay transmission is not the final hop it means there is at least another RN in the mesh between the current RN and the destination wireless node at address DA of the MAC header. In this case, the RN sets next address 4 of the MAC header to point to the next RN 612 and transmits the data frame 614. This process is repeated as necessary until a final hop to address DA is detected. After the final transmission to address DA of the MAC header, the process ends 616.

The simple mesh data frame distribution method of the present invention offers several advantages over methods of the prior art. First, it is compatible with existing IEEE 802.11 networks. A RN of the present invention will appear as a LN to the AP and will appear as an AP to each LLN or NLN it serves. Second, the RN may be any IEEE 802.11 wireless device capable of adding a next address to address field 4 of the MAC header for transmission to a next RN and removing the next address from address field 4 of the MAC header for a final hop transmission to an AP or LN. Third, each RN comprehends redundant data paths which may be used when a wireless node drops out of the data path, thereby making the mesh network less likely to drop data frames. Fourth, the mesh network of the present invention requires no additional components and adds no additional cost to the mesh network. Finally, the mesh network of the present invention extends the coverage area of a single AP over complex structures such as office buildings, apartment complexes, hotels and motels, and other multi-story structures without the need for additional APs.

Figure 7:
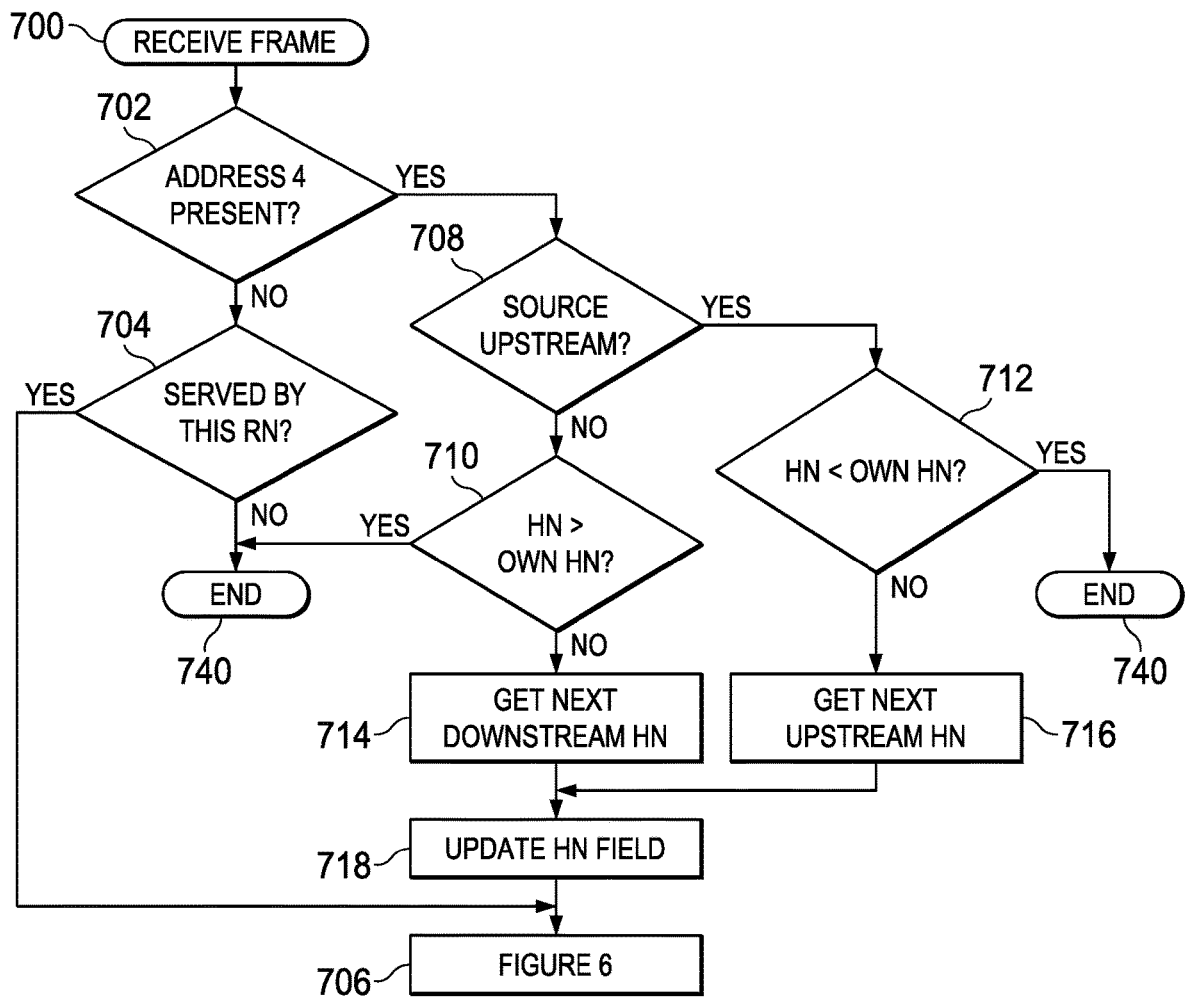
FIG. 7 is a flow diagram showing circular routing detection within a wireless mesh network.

Turning now to FIG. 7, there a flow diagram showing circular routing detection within a wireless mesh network. Formation of a simple mesh network of the present invention preferably precludes circular data frame transmission. This is because RNs in the data path from the AP to any LN preferably have increasing HNs. Thus, downstream transmissions proceed from lower to higher HNs, and upstream transmissions proceed from higher to lower HNs. However, redundant data paths such as 330 (FIG. 3), the condition that each RN may serve multiple RNs and LNs, and the dynamic nature of the mesh network may produce a circular routing path. If undetected, a circular routing path may result in repeated data frame transmission between two or more RNs so that the data frame never reaches the intended destination. The method of FIG. 7 detects and corrects undesirable circular routing paths. A data frame first received 700, and the receiving RN determines if address 4 of the MAC header is present 702. If address 4 is not present, the source is either the AP or one of the LNs. At decision block 704 the receiving RN determines whether the source address (SA) LN is served by this RN. If not, the process ends 740, and the RN effectively decides the data frame is intended for another RN. If the data frame is from an LN served by the receiving RN, data frame transmission continues 706 as previously described with regard to FIG. 6.

If decision block 702 determines that address 4 of the MAC header is present, decision block 708 then determines if the source of the data frame is upstream. If the source is downstream, decision block 710 determines whether the HN of the transmitting RN is greater than the HN of the receiving RN. If so, the process ends 740. If not, a circular routing path is detected since a downstream RN should have a greater HN than an upstream RN. The receiving RN then gets the next downstream HN 714, which is preferably one greater than its own HN and updates the transmitting RN's HN field 718. Data frame transmission then continues 706 as previously described with regard to FIG. 6.

If decision block 708 determines the source is upstream, decision block 712 determines whether the HN of the transmitting RN is less than the HN of the receiving RN. If so, the process ends 740. If not, a circular routing path is detected since an upstream RN should have a smaller HN than a downstream RN. The receiving RN then gets the next upstream HN 716, which is preferably one less than its own HN and updates the transmitting RN's HN field 718. Data frame transmission then continues 706 as previously described with regard to FIG. 6.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method comprising:
    receiving, by a first network device, a data frame from a second network device, wherein the first network device has a first hop number with respect to an access point, and the second network device has a second hop number with respect to the access point;
    determining, by the first network device, whether the second network device is upstream or downstream from the first network device;
    determining, by the first network device, whether a network loop is present based on whether the second network device is upstream or downstream from the first network device and on a comparison of the first hop number with the second hop number; and
    based on the network loop being present, modifying the first hop number of the first network device.

2. The method of claim 1, wherein the modifying includes incrementing the first hop number when the second network device is downstream from the first network device and the second hop number is not greater than the first hop number.

3. The method of claim 1, wherein the modifying includes decrementing the first hop number when the second network device is upstream from the first network device and the second hop number is not less than the first hop number.

4. The method of claim 1, further comprising determining whether the first network device is a relay node and the second network device is a relay node, wherein each of: the determining of whether the second network device is upstream or downstream from the first network device, the determining of whether the network loop is present, and the modifying of the first hop number is performed based on the first network device being a relay node and the second network device being a relay node.

5. The method of claim 1, wherein each of: the determining of whether the second network device is upstream or downstream from the first network device, the determining of whether the network loop is present, and the modifying of the first hop number is performed based on the second network device not being an access point or a leaf node.

6. The method of claim 1, wherein:
    the data frame includes a header that includes a source address and a destination address;
    the method further comprises determining whether the header includes a third address other than the source address and the destination address; and
    each of: the determining of whether the second network device is upstream or downstream from the first network device, the determining of whether the network loop is present, and the modifying of the first hop number is performed based on the header including the third address.

7. The method of claim 6, further comprising:
    based on the header not including the third address, adding the third address to the header such that the third address indicates a third network device; and
    transmitting, by the first network device, the data frame to the third network device.

8. The method of claim 6, further comprising:
    determining whether a subsequent transmission of the data frame is a final hop; and
    based on the header including the third address and the subsequent transmission being the final hop, removing the third address from the header.

9. The method of claim 1, wherein:
    the first network device serves a set of network devices; and
    the method further comprises:
        determining whether the second network device is in the set of network devices; and
        based on the second network device not being in the set of network devices, not transmitting the data frame by the first network device.

10. The method of claim 9, wherein:
the data frame includes a header that includes a source address, a destination address, and a third address that is different from the source address and the destination address; and
the determining of whether the second network device is in the set of network devices serviced by the first network device is based on whether the third address specifies the first network device.

11. A method comprising:
receiving, by a first network device, a data frame from a second network device, wherein the data frame includes a header that includes a source address and a destination address;
determining whether the header includes a third address other than the source address and the destination address; and
based on the header including the third address:
  determining whether a network loop is present; and
  based on the network loop being present, modifying a hop number of the first network device.

12. The method of claim 11, wherein:
the hop number of the first network device is a first hop number;
the second network device is associated with a second hop number;
the method further comprises determining, by the first network device, whether the second network device is upstream or downstream from the first network device; and
the determining of whether the network loop is present is based on whether the second network device is upstream or downstream from the first network device and on a comparison of the first hop number with the second hop number.

13. The method of claim 12, wherein the modifying includes incrementing the first hop number when the second network device is downstream from the first network device and the second hop number is not greater than the first hop number.

14. The method of claim 12, wherein the modifying includes decrementing the first hop number when the second network device is upstream from the first network device and the second hop number is not less than the first hop number.

15. The method of claim 11, further comprising determining whether the first network device is a relay node and the second network device is a relay node, wherein each of: the determining of whether the network loop is present and the modifying of the hop number of the first network device is performed based on the first network device being a relay node and the second network device being a relay node.

16. The method of claim 15, wherein the determining of whether the second network device is a relay node is based on whether the header includes the third address.

17. The method of claim 11, wherein each of: the determining of whether the network loop is present and the modifying of the hop number of the first network device is performed based on the second network device not being an access point or a leaf node.

18. The method of claim 11, further comprising:
based on the header not including the third address, adding the third address to the header such that the third address indicates a third network device; and
transmitting, by the first network device, the data frame to the third network device.

19. The method of claim 11, further comprising:
determining whether a subsequent transmission of the data frame is a final hop; and
based on the header including the third address and the subsequent transmission being the final hop, removing the third address from the header.

20. The method of claim 11, wherein:
the first network device serves a set of network devices; and
the method further comprises:
  determining whether the second network device is in the set of network devices; and
  based on the second network device not being in the set of network devices, not transmitting the data frame by the first network device.

* * * * *